United States Patent [19]

Kim

[11] Patent Number: 5,755,313
[45] Date of Patent: May 26, 1998

[54] LOCKER SYSTEM OF A SHIFT SELECTOR LEVER FOR USE IN AUTOMOBILES HAVING AN AUTOMATIC TRANSMISSION

[75] Inventor: Duk Ki Kim, Seoul, Rep. of Korea

[73] Assignee: Hyundai Motor Company, Seoul, Rep. of Korea

[21] Appl. No.: 662,622

[22] Filed: Jun. 13, 1996

[30] Foreign Application Priority Data

Jun. 14, 1995 [KR] Rep. of Korea ................. 95-15761

[51] Int. Cl.$^6$ ................................................. B60K 41/28
[52] U.S. Cl. ..................... 192/4 A; 477/96; 74/483 R
[58] Field of Search .................... 477/96, 92; 192/4 A; 74/483 R, 483 K

[56] References Cited

U.S. PATENT DOCUMENTS

| | | | |
|---|---|---|---|
| 4,572,340 | 2/1986 | Pierce | 192/4 A X |
| 4,986,399 | 1/1991 | Gokee | 192/4 A |
| 4,991,700 | 2/1991 | Koga | 192/4 A |
| 5,014,831 | 5/1991 | Wawra et al. | 192/4 A |
| 5,058,462 | 10/1991 | Killiany et al. | 192/4 A X |
| 5,065,641 | 11/1991 | Yamamoto et al. | 192/4 A X |
| 5,226,303 | 7/1993 | Dieden et al. | 192/4 A X |
| 5,293,763 | 3/1994 | Asano et al. | 192/4 A X |
| 5,511,641 | 4/1996 | Snell et al. | 192/4 A |

*Primary Examiner*—Charles A. Marmor
*Assistant Examiner*—Saúl Rodríguez
*Attorney, Agent, or Firm*—Finnegan, Henderson, Farabow, Garrett & Dunner, L.L.P.

[57] ABSTRACT

Disclosed is the present invention wherein a locker system of a shift selector lever for use in automobiles having an automatic transmission including a locker apparatus of a shift lock lever plate descending the first guide slot by a locker pin when the driver pushes the push button, a member for restraining of a control pin moved toward the brake cable in the locker guide slot for descending the shift lock lever plate when the driver works a brake pedal connected with brake cable and a apparatus for pulling of a connecting rod removing the parking to pull the key inter lock cable as the connecting rod that is connected with a hinge is descended along the first guide slot and moves left and right in the second guide slot.

4 Claims, 2 Drawing Sheets

LOCKER SYSTEM OF A SHIFT SELECTOR LEVER FOR USE IN AUTOMOBILES HAVING AN AUTOMATIC TRANSMISSION

BACKGROUND

The present invention relates to a locker system of a shift selector lever for use in automobiles having an automatic transmission, and specifically, to a locker system which increases the safety of automotive vehicles by only allowing disengagement of a shift selector lever from a parking position when a driver has a brake pedal depressed.

Generally, in vehicles having an automatic transmission, a range shift is made by a rectilinear turnaround motion of a shift selector lever. An indicator panel is attached in an identical direction of the lever movement on a base portion of a shift selector lever. The shift selector lever is fixed with stops so that the lever stays in the position the driver has selected.

As such, conventional vehicles have adopted a solenoid type parking lock lever for the shift selector lever.

However, such a solenoid type parking lock lever is a costly vehicle part, which causes an unfavorable effect on improving competitiveness in view of cost reduction.

Therefore, there is a need for means that fixes the shift selector lever other than this solenoid type parking lock lever, the function of which is identical to that of the solenoid type parking lock lever.

SUMMARY

The present invention has been made in an effort to solve the above problem.

It is an object of the present invention to provide a locker system for automotive vehicles having an automatic transmission that does not permit a shift selector lever from to move out of a parking position unless a brake pedal is depressed, thus, providing safety when starting the vehicle from a stopped position.

To achieve the above object, the present invention provides a locker system of a shift selector lever for use in automobiles having an automatic transmission comprising a mode fixing means for fixing a shift lever in a certain shift mode or releasing from the mode while moving up and down according to an operation of a push button. The locker system also includes a shift lever interlock means for preventing release of the fixing means if a driver does not operate a brake when the shift lever is positioned in a parking position. The locker system further includes a guide slot that is formed to allow a shift lever interlock means to be moved to a third position corresponding to a release position of the brake.

The invention further provides a locker system of a shift selector lever for use in automobiles having an automatic transmission comprising:

locker means of a shift lock lever plate descending in the first guide slot by a locker pin when the driver pushes the push button;

means for controlling movement of a control pin toward the brake cable in the locker guide slot allowing the shift lock lever plate to descend when the driver works a brake pedal connected with a brake cable; and means for pulling a connecting rod connected to a key interlock cable, where the connecting rod also is connected with a hinge that descends along the first guide slot, and moves left and right in the second guide slot such that a key cannot be pulled from the key box—after "guide slot".

A locker system of a shift selector lever for use in automobiles having an automatic transmission wherein the shift lock lever plate has a locker guide slot, which has a generally-placed C-shape in its racket-shaped face. a keeper groove descended with a locker pin when a control pin moves toward a brake cable in the locker guide slot, a roller hinge of a base portion of the shift lock lever plate connected with the connecting rod to move up and down in the first guide slot.

A shift selector lever of an automatic transmission for automotive vehicles wherein the control pin inserted at a locker guide slot having a generally placed C-shape therein is pulled toward a brake cable and makes a descent of the shift lock lever plate as a brake pedal is pushed.

A locker system of a shift selector lever for use in automobiles having an automatic transmission wherein the first guide slot that has a leftward tilt from a vertical position is made to allow easy descent of a shift lock lever plate in a slide guide plate.

A locker system of a shift selector lever for use in automobiles having an automatic transmission wherein the second guide slot that has a rightward tilt from a horizontal position is drilled having a constant length in the slide guide plate.

A locker system of a shift selector lever for use in automobiles having an automatic transmission wherein the connecting rod connected with a base portion of a shift lock lever plate descends in the first guide slot, then pulls a key interlocked cable connected with a key box.

BRIEF DESCRIPTION OF THE DRAWINGS

These and other objects, features, aspects and advantages of the present invention will become more fully apparent from the following detailed description of the present invention when taken in conjunction with the accompanying drawings where like reference numerals denote corresponding parts throughout.

DESCRIPTION

Reference will now be made to the accompanying drawings which illustrate an embodiment of the invention.

Figure 1:
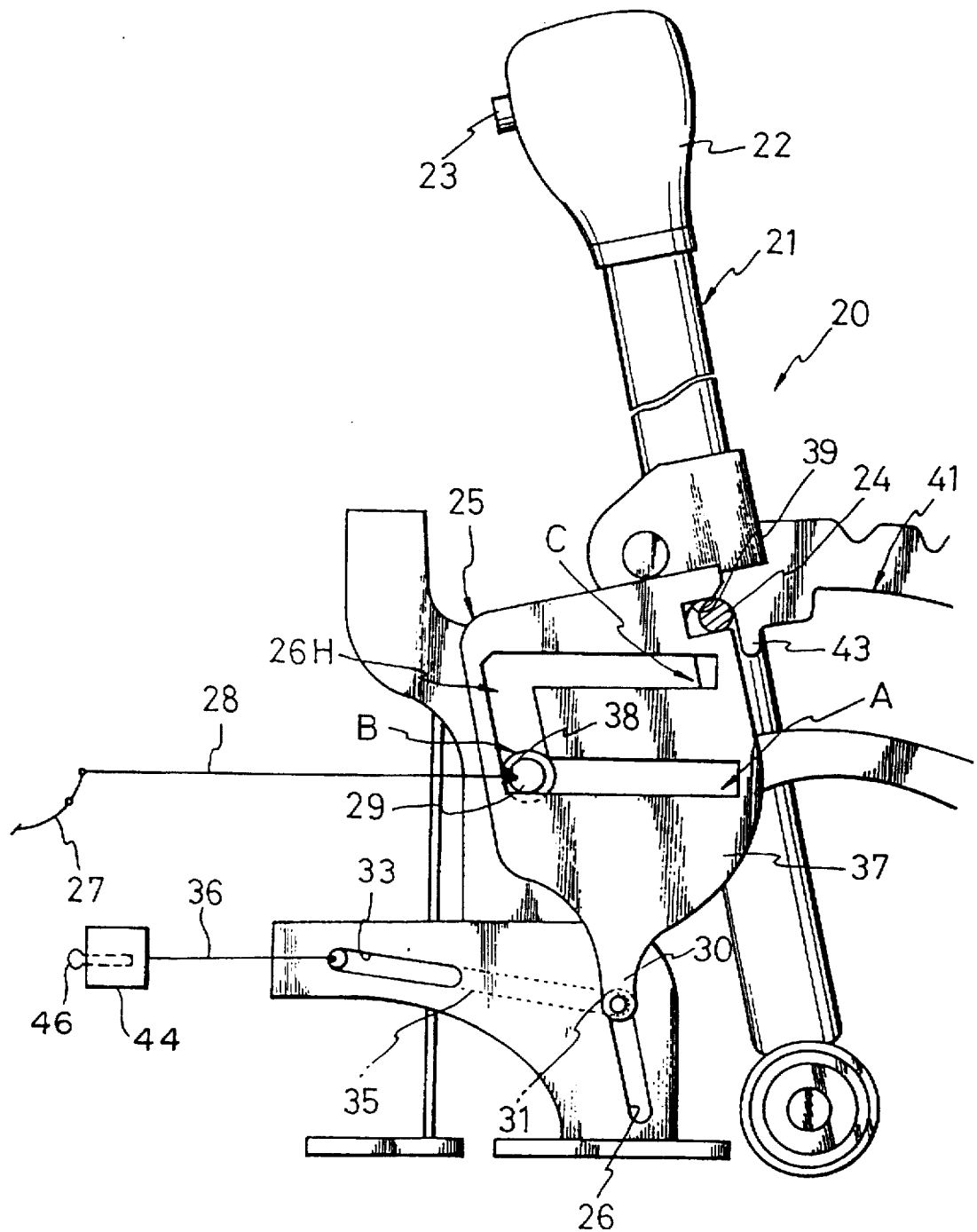
FIG. 1 shows an organization of a locker system of a shift selector lever in this invention.

FIG. 1 shows a locker system of a shift selector lever according to a preferred embodiment of the present invention wherein the reference numeral 20 indicates a locker system.

The locker system 20 of a shift selector lever for use in an automobile wherein a shift lock lever plate 25 descends in a first guide slot 26 as forced by a locker pin 24 when a driver pushes a push button 23, formed in a grip 22 of a shift selector lever 21.

Also, the shift lock lever plate 25 is released to descend along the first guide slot 26 as a brake pedal 27 is depressed. As a control pin 29 is connected with a brake cable 28 in a locker guide slot 26H, the control pin 29 moves forward releasing tension, and, thus, allows the shift lock lever plate 25 to descend.

With the forward movement of the control pin 29, a shift lock lever plate 25 descends in the first guide slot 26 by a roller hinge 31 connected with a base portion 30 of the shift lock lever plate 25.

When the shift lock lever plate 25 descends in the first guide slot 26, a connecting rod 35, which has a roller hinge 31 on one end and is disposed at a fixed angle, moves in the first guide slot 26 and then in the second guide slot 33.

When the shift lock lever plate 25 moves up and down in the first guide slot 26, a key inter lock cable 36, that is connected with the connecting rod 35, moves left and right in the second guide slot 33, and, at the same time is pulled or loosened by the connecting rod 35.

The shift lock lever plate 25, on its racket-shaped face 37, has a generally C-shaped locker guide slot 26H.

A control pin 29 supported by an elastic member 38 is disposed in the locker guide slot 26H.

When the push button 23 is pushed, the shift lock lever plate 25, in which the control pin 29 is inserted, descends together with the locker pin 24 hooked in a keeper groove 39.

The shift lock lever plate 25 has a projecting at base portion 30 that is connected with the connecting rod 35 by the roller hinge 31 and moves up and down in the first guide slot 26.

When the brake pedal 27 is operated, said control pin 29 that is inserted in the locker guide slot 26H, moves from a position A of the control pin 29 supported by the elastic member 38 to a portion B thereof.

The control pin 29 is moved to a position B in the locker guide slot 26H and the shift lock lever plate 25 descends along the first guide slot 26 with the locker pin 21 as the driver pushes the push button 23. The driver can then shift freely to a shift range from the parking range.

The first guide slot 26 that is made to slide the base portion 30 of the shift lock lever plate 25 by the roller hinge 31 is formed in a slide guide plate 42.

The first guide slot 26 is slanted slightly leftward from a vertical position and is disposed in the slide guide plate 42, and the second guide slot 33 is tilted downward from a horizontal position is fixed at a constant length in the slide guide plate 42.

One side of the connecting rod 35 is disposed with the base portion 30 of the shift lock lever plate 25 in the first guide slot 26, the other side thereof is disposed in the second guide slot 33 and pulls the key interlock cable 36. So a key cannot come out of a key box unless the vehicle is in the parking range.

While the vehicle is being driven or not parked, the control pin 29 that is supported by an elasticity member has moved from a position B to a position C in the locker guide slot 26H as the shift lock lever plate 25 descends along the first guide slot 26. Then the key 46 cannot be removed from a key box 44 because the connecting rod 35, connected with the key interlock cable 36 pulls, the key box 44.

The key box 44 that is connected with the key interlock cable 36 is pulled by the connecting rod 33 as the shift lock lever plate 25 comes down the first guide slot 26, then, the key 46 cannot be pulled from the key box 44.

If the shift selector lever 21 is positioned at a parking range again, the shift lock lever plate 25 ascends by a spring(not shown) in the shift selector lever 21, and the connecting rod 35 loosens the key interlock cable 36, then the key 46 can be pulled from the key box.

Figure 2:
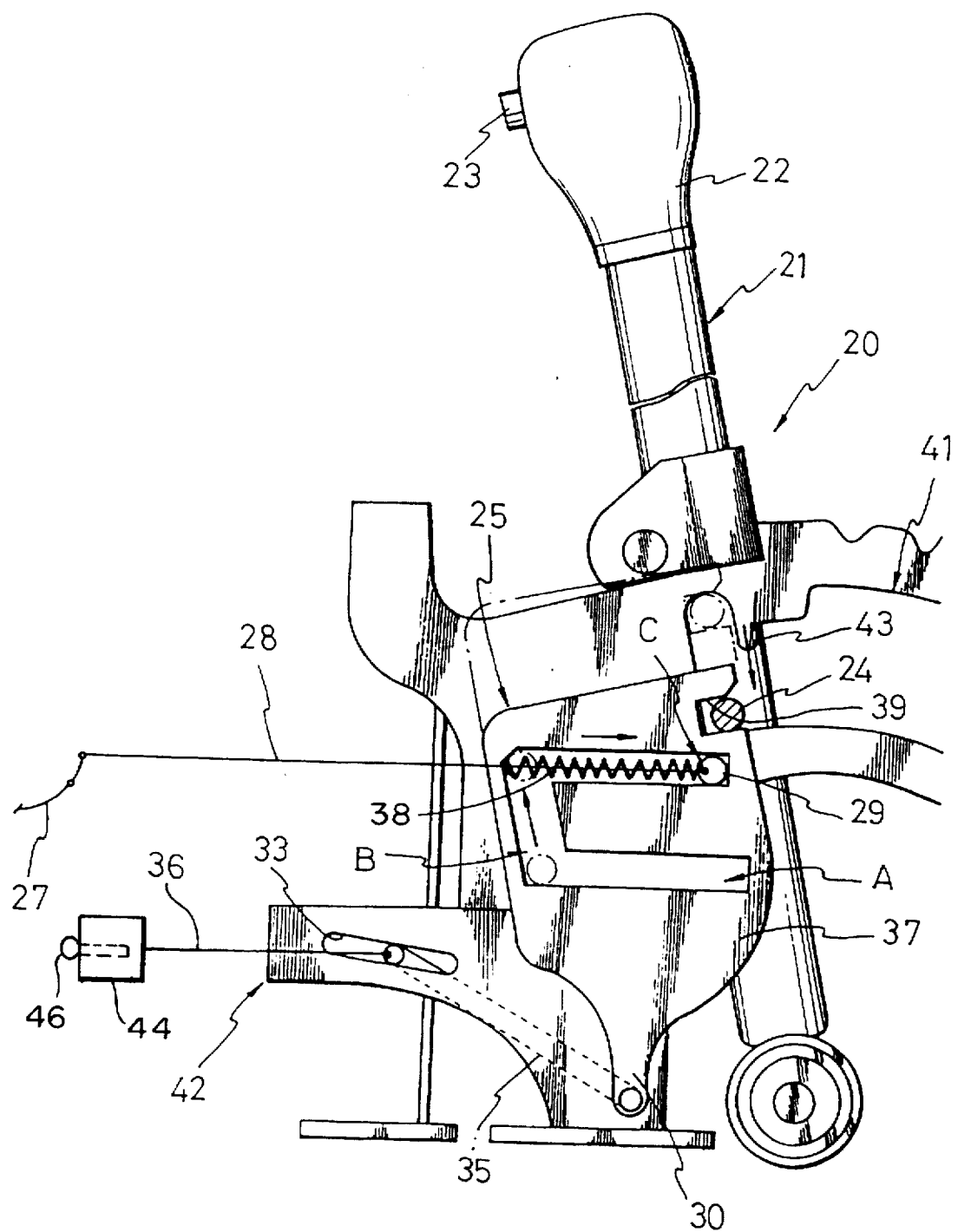
FIG. 2 shows an operation of a locker system of a shift selector lever in this invention.

The following is the operation of the present invention, as shown in FIG. 2. When an automobile having an automatic transmission is parked, the parking lever 21 is placed in the parking range.

When the shift selector lever 21 is in the parking range, the locker pin 24 is caught on the keeper groove 39 at the shift lock lever plate 25 and the control pin 29 is positioned at the position A in the locker guide slot 26H. Then, the shift lock lever plate 25 does not move so that the shift selector lever 21 cannot be changed by the driver.

If the parked vehicle is to be driven, the driver works the brake pedal 27 before pushing the push button 23 of the shift selector lever 21. In this way, the vehicle is prevented from sudden starting from a parking position by the locker system.

When the driver works the brake pedal 27, the brake pedal 27 pulls the control pin 29, that is connected with the brake cable 28, from a position A to a position B in the locker guide slot 26H.

The control pin 29 is supported by the elasticity member 38 and is restored by the elasticity member 38 when the driver takes his foot off the brake pedal 29.

The control pin 29 is pulled to a position B by the brake pedal 29 if the driver works the brake pedal 29. Then, the locker pin 24 is not caught on the keeper groove 39 if the driver pushes the push button 23, and is descended with the shift lock lever plate 25.

With the shift lock lever plate 25 coming down, the locker pin 24 comes out of the keeper groove's 39 projection portion 43, therefore, the shift selector lever 21 is freely moved by the driver.

When the shift lock lever plate 25 comes down, the base portion 30 descends down the first guide slot 26, and the connecting rod 35, connected to the base portion 30 through the roller hinge 31, gets pulled.

If the connecting rod 35 is pulled, the key interlock cable 36, which is connected to the other end of the connecting rod 35 inserted in the second guide slot 33, becomes pulled, and the key 46 cannot be taken out from the key box 44. However, if the shift selector lever 21 is positioned in the parking range, the key interlock cable 36 is not pulled and the key 46 is able to be taken out from the key box 44.

The present invention, wherein a solenoid-type shift selector lever is not applied to shift selector lever but the structure is changed to where a key interlock cable and a brake cable type is applied. Consequently, this system eliminates the use of high-priced parts, reduction in overall price.

What is claimed is:

1. A locker system of a shift selector lever for use in automobiles having an automatic transmission comprising:

a mode fixing means for fixing a shift lever in a certain shift mode or releasing from said certain shift mode by moving said mode fixing means up and down upon an operation of a push button; and shift lever interlock means for preventing a release of said fixing means if a brake is not operating when the shift lever is positioned in a parking position; and said shift lever interlock means having a guide slot to allow a control pin connected with said brake through a cable to be moved to a position corresponding to a release position of said brake.

2. A locker system of a shift selector lever according to claim 1, further comprising a key interlock means for preventing a key from being pulled out of a key box coupled with a base portion of said shift lever interlock means through a connecting rod and a key interlock cable, when said shift lever interlock means is descended.

3. A locker system of a shift selector lever for use in automobiles having an automatic transmission according to claim 1, wherein said shift lever interlock means is provided with a keeper groove where said fixing means is inserted.

4. A locker system of a shift selector lever according to claim 1, wherein said key interlock means comprises a slide guide plate fixed at a vehicle body and a roller hinge disposed at a base portion of said shift lever interlock means and the connecting rod connected with a roller on one side and with said roller hinge on the other side, said slide guide plate having a first guide slot for guiding said roller hinge and a second guide slot for guiding said roller connected with the key interlock cable.

* * * * *